Aug. 15, 1961   H. GRÜBER ET AL   2,996,559
METHOD AND APPARATUS FOR OPERATING A VACUUM ARC SMELTING FURNACE
Filed June 6, 1958   2 Sheets-Sheet 2
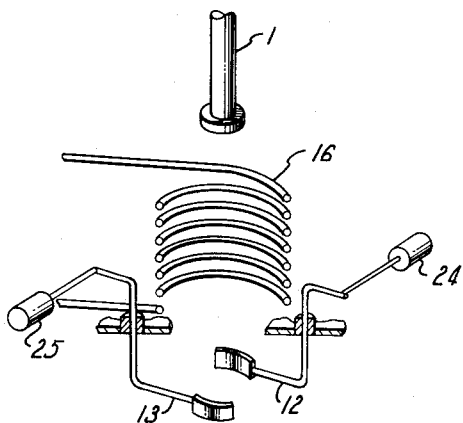
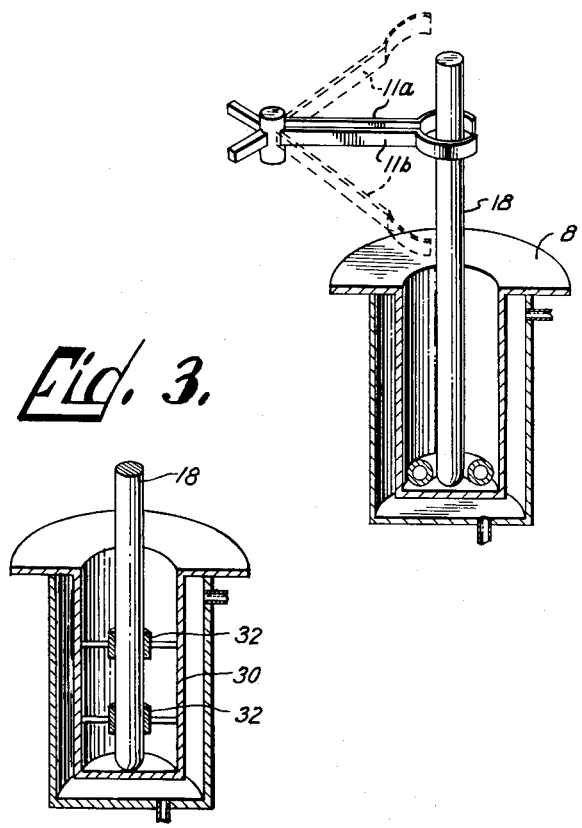

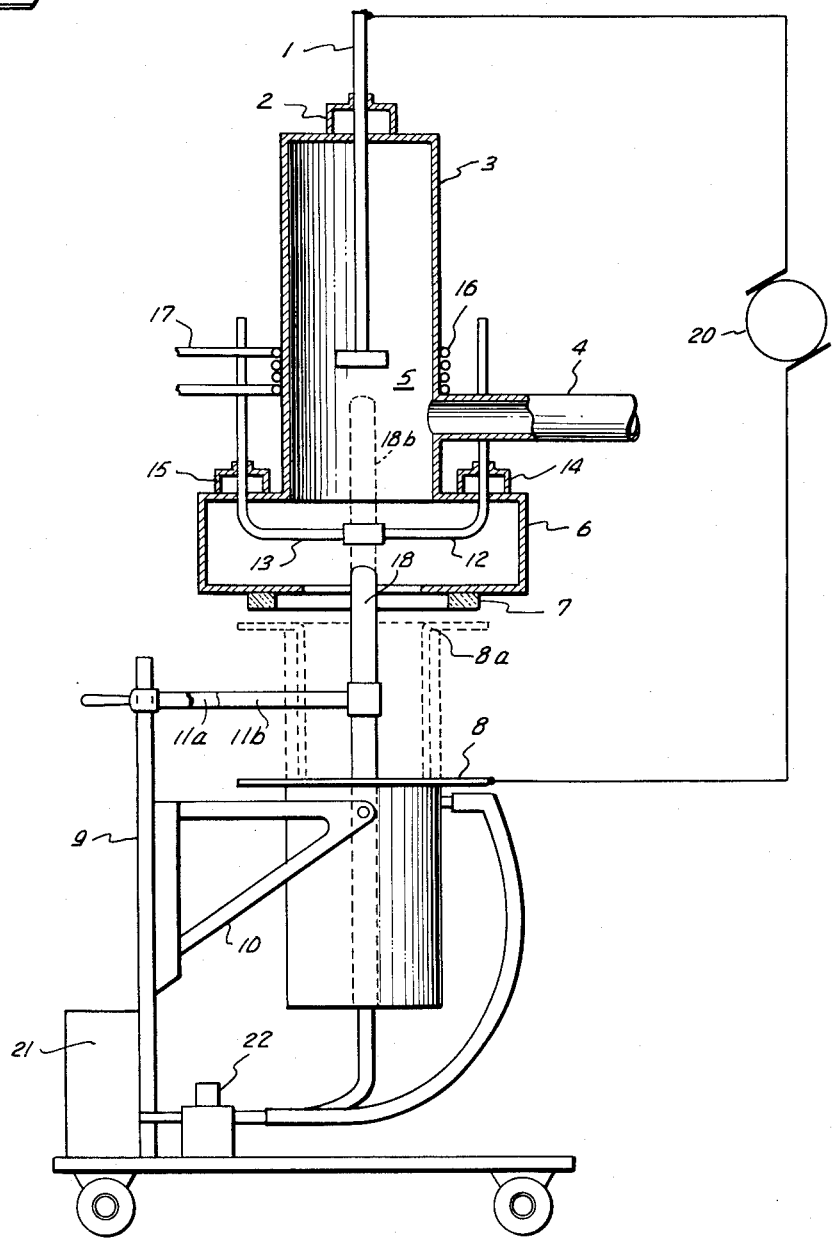

United States Patent Office 2,996,559
Patented Aug. 15, 1961

2,996,559
METHOD AND APPARATUS FOR OPERATING A VACUUM ARC SMELTING FURNACE
Helmüt Grüber and Helmut Scheidig, Hanau (Main), Germany, assignors to W. C. Heraeus G.m.b.H., Hanau (Main), Germany, a corporation of Germany
Filed June 6, 1958, Ser. No. 740,344
Claims priority, application Germany June 11, 1957
12 Claims. (Cl. 13—14)

The present invention relates to a method and apparatus for operating a vacuum-arc smelting furnace.

A source of considerable difficulties in the operation of vacuum arc furnaces consists in properly supplying the operating current to the electrode of the furnace. The electric connection for supplying the current to the movable consumable electrode by means of rollers is, because of the high amperages involved in producing the arc, not very reliable. Also the other method which has previously been applied and which consists in providing the lower end of the electrode supporting rod with a clamp for gripping the upper end of the electrode is very inadequate. The contact surfaces between the current supply rollers and the movable electrode or between the clamp on the suspension rod and the electrode are too small for the high amperages involved and have too high a resistance in order to transmit the current properly. Although the further known method of supplying the current to the electrode by welding it onto the suspension or current supply rod has proved quite successful, it has the disadvantage that it is generally impossible to weld the electrode within the furnace to the suspension rod because of the difficulty of centering it thereto. It is therefore necessary to do this outside of the furnace which, however, entails a certain loss of time for the necessary reinsertion of the electrode together with the supporting rod. Furthermore, even outside of the furnace it is difficult to adjust the electrode and the suspension rod relative to each other so as to be welded in the proper position to each other.

It is an object of the present invention to provide a new method which easily overcomes the above-mentioned difficulties. This invention consists in providing suitable mechanical means within the furnace for centering the consumable electrode so as to permit the latter to be welded in the appropriate position to the suspension rod within the furnace.

Another object of the present invention is to provide a magnetic field for concentrating the electric arc during the welding operation, and to design the crucible so as to be easily removable from the furnace by means of a movable carriage on which it is permanently mounted.

Further objects, features, and advantages of the present invention will be apparent from the following detailed description thereof, particularly when read with reference to the accompanying drawings, in which—

FIGURE 1 shows the new vacuum arc furnace partly in cross section; while

FIGURE 2 shows an exploded view, partly in perspective and partly in cross section, of the essential elements of the invention, and FIGURE 3 shows a view, partly in perspective and partly in cross section of a modification of an element of the present invention.

Referring to the drawings, the electrode suspension rod 1 is permanently inserted into a housing or upper part of a furnace 3 and is slidable within a socket 2 which also seals rod 1 toward the outer atmosphere. A pipe 4 connects a pump unit, not shown, to furnace 3 to evacuate the inside thereof and also to flood the same with air when necessary. The upper furnace part 3 is connected to a central part 6 which carries on its lower side a sealing ring 7 of insulating material against which the crucible 8 may be pressed to seal the upper end thereof tightly toward the outside. For this purpose, crucible 8 is mounted on a carriage 9 which is provided with a hoisting mechanism 10 for raising and lowering crucible 8. The upright carrying the hoisting mechanism 10 also carries two supporting arms 11a and 11b with claws at their ends which are adapted to surround an electrode 18 and maintain the same in a central upright position without preventing a sliding movement of the electrode in its longitudinal direction. The central part 6 of the furnace also contains two arms 12 and 13 which likewise have claws at their ends for gripping the electrode. Each of arms 12 and 13 is adapted to be swiveled relative to the other arm about a vertical axis within a socket 14 or 15, respectively. Supporting arms 11a, 11b, and 14, 15 may be operated by any suitable means, known as such, for example, hydraulical means, or by hand. The upper part 3 of the furnace is also surrounded by a coil 16 of a solenoid which may be supplied with direct or alternating current by a suitable source of such current through conductors 17.

The operation of the new furnace is substantially as follows:

While carriage 9 is in a suitable position away from the stationary upper furnace parts 3 and 6, a suitable material may at first be placed upon the bottom of crucible 8 and a consumable electrode 18 may then be inserted into the crucible and held by such material in a substantially central position. Thereupon, the two supporting arms 11a and 11b are closed so as to grip the electrode loosely and hold it vertically within crucible 8. By closing arms 11a and 11b, the upper end of the electrode will also be automatically centered relative to the crucible. During this time, hoisting mechanism 9 with crucible 8 thereon will be lowered to such an extent that the upper end of electrode 18 will be at a lower level than the sealing ring 7 on the lower side of furnace part 6. Carriage 9 will then be moved to a position in which crucible 8 is vertically centered relative to furnace part 6, whereupon hoisting mechanism 9 will be operated to lift crucible 8 until the upper end of electrode 18 has reached a level above that of the supporting arms 12 and 13. These arms are then closed either by hand or by hydraulic means 24 and 25 so as to grip electrode 18 and hold it in a fixed position within the upper furnace parts 3 and 6. Thereupon the lower supporting arms 11a and 11b are opened widely and crucible 8 is further raised until its upper rim engages with and presses tightly against sealing ring 7 so that the entire furnace chamber 5 will then be closed toward the outer atmosphere. Electrode 18 will then be in a position 18b as indicated in dotted lines in FIGURE 1. Thereafter, the electrode suspension rod 1 will be lowered until it engages with the upper end of electrode 18b. The furnace will then be evacuated and the current of generator 20 will be switched on so as to weld electrode 18b to suspension rod 1. At this time, a current may be supplied through conductors 17 to produce a magnetic field in coil 16 for concentrating the welding arm. This has the advantage that electrode 18 will be welded to suspension rod 1 not only at the outer edge thereof, but also at larger surface areas. Such concentration of the welding arc also avoids the danger that, while the outer edge of the electrode is being welded to the suspension rod, the melting material might run down the electrode like the wax of a burning candle, which might generally interfere with the proper melting operation and lead to a poorly conductive connection between the electrode and its suspension rod 1. After electrode 18 and suspension rod 1 have thus been firmly welded together, the electrode may be lifted slightly whereupon, after supporting arms 12 and 13 have been swiveled apart, the actual melting process may be started. After the completion of the melting process, the filled crucible 8 may again be lowered and moved away on carriage 9.

While during the melting operation the crucible may be cooled by connecting its cooling jacket to the water main, it is, while the crucible together with the hot ingot therein is moved to another place to permit the latter to cool, preferably connected to a pump 22 which, in turn, is connected to a cold-water tank 21. Tank 21 and pump 22 are preferably mounted on carriage 9 so as to be movable therewith.

A modification of the present invention is shown in FIG. 3 and includes a centering crucible 30 in place of the supporting arms 12 and 13, that is, a crucible into which the electrode is just capable of sliding or in which it is centrally held by suitable rings or flanges 32. Within this centering crucible the electrode is then inserted into the furnace, whereupon the centering crucible is replaced by a regular crucible in which the melting process is carried out.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A method of operating a vacuum arc furnace having an opening in a lower portion constructed and arranged to overlie a crucible, and having an electrode suspension rod mounted in an upper part of the furnace, the method comprising the steps of inserting an elongated electrode into the crucible of the furnace and centering said electrode in a vertical position within said crucible while said crucible is separated from the upper part of the furnace, lifting said crucible with said centered electrode therein into locking engagement with said upper furnace parts, then lowering the electrode suspension rod within said upper parts into engagement with the upper end of said electrode, evacuating said furnace, and welding said electrode to said suspension rod by means of an electric current supplied to said furnace for subsequently producing an arc therein.

2. A method of operating a vacuum arc furnace having an opening in a lower portion constructed and arranged to overlie a crucible, and having an electrode suspension rod mounted in an upper part of the furnace, the method comprising the steps of centering an elongated electrode within the crucible at a point spaced from the upper part of said furnace, connecting said crucible to said upper part, lowering the electrode suspension rod within said upper part into engagement with the upper end of said electrode, evacuating said furnace, subjecting said electrode and said suspension rod to the influence of a magnetic field, and welding said electrode to said electrode suspension rod by means of an electric current supplied to said furnace for subsequently producing an arc therein.

3. A method of operating a vacuum arc furnace having an opening in a lower portion constructed and arranged to overlie a crucible, and having an electrode suspension rod mounted in an upper part of the furnace, the method comprising the steps of inserting an elongated electrode into the crucible and centering it therein in a vertical position, moving said crucible with said centered electrode therein laterally to a position underneath the upper part of said furnace, lifting said crucible with said centered electrode therein into locking engagement with said upper furnace part, lowering an electrode suspension rod within said upper part of the furnace into engagement with the upper end of said electrode, evacuating said furnace, subjecting said electrode and said suspension rod to the influence of a magnetic field extending concentrically thereto, and welding said electrode to said suspension rod by means of an electric current supplied to said furnace for subsequently producing an arc therein.

4. A vacuum arc furnace comprising a furnace housing having an opening constructed and arranged to overlie a crucible, a crucible, means for raising and lowering said crucible relative to said furnace housing and for connecting said crucible to said furnace housing when in the raised position, an upright, elongated consumable electrode disposed in the crucible, means operative from the outside of said furnace for centering the electrode within said crucible, an electrode suspension rod slidably mounted within said furnace housing and constructed and arranged to engage the upper end of said electrode when said crucible with said electrode therein is in the raised position, means for supplying an electric current to said furnace for electrically welding said electrode to said suspension rod, and means for evacuating said furnace.

5. A vacuum arc furnace as defined in claim 4, further comprising a magnetic coil disposed coaxially around the junction of the electrode and the suspension rod for concentrating the welding arc.

6. A vacuum arc furnace as defined in claim 4, wherein said centering means comprise a pair of cooperating holding means for holding said electrode in a central vertical position, and means connected to said holding means for opening and closing the same from the outside of said furnace.

7. A vacuum arc furnace as defined in claim 4, wherein said centering means comprise a pair of cooperating holding means for slidably holding said electrode in a central vertical position when said crucible is in the lowered position, means for opening and closing said holding means, a pair of cooperating gripping means within said upper furnace part, and means connected to said gripping means and extending to the outside of said furnace for opening and closing said gripping means.

8. A vacuum arc furnace as defined in claim 4, further comprising a carriage, said raising and lowering means being mounted on said carriage so as to permit said electrode to be inserted into said crucible laterally away from said upper furnace part and to permit said crucible to be moved underneath said upper furnace part and then to be raised and pressed against said upper furnace part to be hermetically connected thereto.

9. A vacuum arc furnace as defined in claim 7, further comprising a carriage, said raising and lowering means, as well as said holding means, being mounted on said carriage so as to permit said electrode to be inserted into said crucible laterally away from said upper furnace part and to permit said crucible to be moved underneath said upper furnace part and then to be raised to insert said electrode between said gripping means, and then after said holding means have been opened, to be pressed against said upper furnace part to be hermetically connected thereto merely by said raising means.

10. A vacuum arc furnace as defined in claim 8, further comprising a cold-water tank and a pump mounted on said carriage, said pump being connected to said tank and to said crucible for cooling said crucible.

11. A method for mounting a consumable electrode in an electric arc furnace having an opening in a lower portion constructed and arranged to overlie a crucible, and having an electrode suspension rod mounted in an upper part of the furnace, the method comprising the steps of disposing the electrode to be in direct contact with the suspension rod and centered relative to the crucible opening in the furnace, and welding the electrode to the suspension rod while the suspension rod is mounted in the furnace.

12. A vacuum arc furnace comprising a furnace housing having an opening in the lower end thereof, first and second crucibles, means for raising and lowering each of the crucibles relative to the housing and for connecting one of the crucibles to the housing when said one crucible is in the raised position so that said one crucible extends below the opening, an upright elongated consumable electrode disposed in the first crucible, the first crucible including means for centering the electrode within the first crucible, an electrode suspension rod slidably mounted within the housing and constructed and arranged to engage the upper end of the electrode when the first crucible with the electrode therein is in the raised position, means for supplying an electric current to said furnace for electrically welding the electrode to the suspension rod, and means for evacuating said furnace when the second crucible is connected to the housing.

References Cited in the file of this patent
UNITED STATES PATENTS

| | | |
|---|---|---|
| 1,972,849 | Wisdom | Sept. 4, 1934 |
| 2,651,668 | Southern | Sept. 8, 1953 |
| 2,668,183 | Foyn | Feb. 2, 1954 |
| 2,726,278 | Southern | Dec. 6, 1955 |
| 2,797,251 | Damgen | June 27, 1957 |
| 2,857,445 | Mangin | Oct. 21, 1958 |